(12) United States Patent
Sugiura

(10) Patent No.: US 11,414,560 B2
(45) Date of Patent: Aug. 16, 2022

(54) OIL-BASED INKJET INK

(71) Applicant: RISO KAGAKU CORPORATION, Tokyo (JP)

(72) Inventor: Hikaru Sugiura, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 634 days.

(21) Appl. No.: 16/519,887

(22) Filed: Jul. 23, 2019

(65) Prior Publication Data
US 2020/0040206 A1 Feb. 6, 2020

(30) Foreign Application Priority Data
Jul. 31, 2018 (JP) .............................. JP2018-143983

(51) Int. Cl.
*C09D 11/36* (2014.01)
*C09D 11/326* (2014.01)

(52) U.S. Cl.
CPC ............ *C09D 11/36* (2013.01); *C09D 11/326* (2013.01)

(58) Field of Classification Search
CPC ..... C09D 11/36; C09D 11/322; C09D 11/033; C09D 11/037; C09D 11/326; C09D 11/40; C09D 11/06; C09D 11/30; B41J 2/2107
See application file for complete search history.

(56) References Cited

U.S. PATENT DOCUMENTS

| | | | |
|---|---|---|---|
| 8,642,695 B2 | 2/2014 | Uozumi et al. | |
| 10,487,455 B2 | 11/2019 | Moriya et al. | |
| 10,793,734 B2 | 10/2020 | Sugiura et al. | |
| 10,865,320 B2 | 12/2020 | Shimura et al. | |
| 2008/0007588 A1 | 1/2008 | Yoshimura | |
| 2012/0293581 A1* | 11/2012 | Aoki | B41M 5/5218 428/32.37 |
| 2014/0022299 A1 | 1/2014 | Yokoi et al. | |
| 2015/0184011 A1* | 7/2015 | Shimura | B41J 2/1631 347/21 |
| 2018/0244936 A1 | 8/2018 | Shimura et al. | |
| 2018/0244937 A1 | 8/2018 | Sugiura et al. | |
| 2018/0244938 A1 | 8/2018 | Morinaga et al. | |
| 2018/0244939 A1 | 8/2018 | Sugiura et al. | |
| 2018/0244940 A1 | 8/2018 | Ando et al. | |
| 2018/0244941 A1 | 8/2018 | Sugiura et al. | |
| 2019/0100668 A1 | 4/2019 | Ando et al. | |
| 2019/0100671 A1 | 4/2019 | Morinaga et al. | |

FOREIGN PATENT DOCUMENTS

| | | |
|---|---|---|
| CN | 101302371 | 11/2008 |
| CN | 101463208 | 6/2009 |
| CN | 103459522 | 12/2013 |
| CN | 108504183 | 9/2018 |
| CN | 108504191 | 9/2018 |
| EP | 3366733 | 8/2018 |
| EP | 3366739 | 8/2018 |
| EP | 3461868 | 4/2019 |
| JP | 2001-342388 | 12/2001 |
| JP | 2004-217703 | 8/2004 |
| JP | 2007-161892 | 6/2007 |
| JP | 2016-196564 | 11/2016 |
| JP | 2017-105162 | 6/2017 |

OTHER PUBLICATIONS

The extended European Search Report issued for European patent application No. 19188331.3, dated Mar. 11, 2020, 6 pages.
"Contemporary Cosmetics Science and Technology" Mar. 30, 2016, pp. 1139-1140; partial translation provided.
Office Action issued for Chinese Patent Application No. 201910700964.X, dated Aug. 31, 2021, 22 pages including machine translation.

* cited by examiner

*Primary Examiner* — Jannelle M Lebron
(74) *Attorney, Agent, or Firm* — Hamre, Schumann, Mueller & Larson, P.C.

(57) ABSTRACT

An oil-based inkjet ink containing a pigment, a pigment dispersant and a non-aqueous solvent, wherein the non-aqueous solvent contains a silicone oil and a fatty acid ester having 10 to 40 carbon atoms per molecule and having a ratio of (total number of atoms in side chains/total number of atoms in main chain) of at least 0.20.

8 Claims, No Drawings

OIL-BASED INKJET INK

This application is based upon and claims the benefit of priority from prior Japanese Patent Applications No. 2018-143983 filed on Jul. 31, 2018, the entire contents of which are incorporated by reference herein.

BACKGROUND OF THE INVENTION

Field of the Invention

The present invention relates to an oil-based inkjet ink.

Description of the Related Art

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

In the case of oil-based inks, when the ink solvent penetrates into the recording medium such as a paper, the pigment tends to penetrate into the interior of the paper together with the solvent, which can lead to a problem of reduced surface density for the printed item, and can also cause a problem in which the ink penetrates through to the rear surface of the printed item, so-called strike-through.

Further, oil-based inks also suffer from foaming upon shaking or the like. In an ink production line, ink foaming may occur during stirring steps, transport steps, and individual cartridge filling steps and the like. Further, in printing devices, foaming may also occur in the vicinity of the inkjet nozzles when discharging the ink from the nozzles, which can cause liquid dripping or discharge faults.

Ink foaming is particularly problematic when two or more solvents having different properties are used.

Furthermore, with oil-based inks, when the ink is discharged from an inkjet nozzle, the ink can sometimes disperse in a mist-like form. This ink mist can adhere to the inside of the printing device, causing contamination or faults, or may also adhere to printed items, causing a deterioration in the image quality.

Patent Document 1 (JP 2004-217703 A) proposes the use of a specific modified silicone oil as a dispersant in order to enable the pigment to be dispersed stably using a silicone-based solvent.

Patent Document 2 (JP 2001-342388 A) proposes an ink for an inkjet printer which, in order to enhance the dispersion stability, contains a pigment and an organic solvent, and has an added silicone-based graft polymer that is adsorbed to at least a portion of the outer surface of the pigment. In Patent Document 2, finely dispersing the pigment in the silicone-based organic solvent is the main objective.

SUMMARY OF THE INVENTION

One embodiment of the present invention provides an oil-based inkjet ink containing a pigment, a pigment dispersant and a non-aqueous solvent, wherein the non-aqueous solvent contains a silicone oil and a fatty acid ester having 10 to 40 carbon atoms per molecule and having a ratio of (total number of atoms in side chains/total number of atoms in main chain) of at least 0.20.

DETAILED DESCRIPTION OF THE EMBODIMENTS

Patent Document 1 attempts to address problems associated with conventional organic solvents such as clear file deformation by using a silicone-based solvent without using a conventional organic solvent. However, inks that use a silicone-based solvent tend to suffer from the problem of ink mist generation from the inkjet nozzles. Further, when a combination of a silicone-based solvent and another solvent is used, ink foaming tends to occur more readily.

Patent Document 2 proposes the use of a specific dispersant to enable the pigment to be dispersed in the silicone-based solvent. Patent Document 2 discloses the use of organic solvents besides the silicone-based solvent, but using an organic solvent in combination with the silicone-based solvent can sometimes cause ink foaming to occur more readily.

An object of the present invention is to improve the image quality of printed items and prevent ink foaming.

Embodiments of the present invention are described below. However, the examples in the following embodiment in no way limit the present invention.

An oil-based inkjet ink according to one embodiment (hereafter sometimes referred to a simply "the ink") contains a pigment, a pigment dispersant and a non-aqueous solvent, wherein the non-aqueous solvent contains a silicone oil and a fatty acid ester having 10 to 40 carbon atoms per molecule and having a ratio of (total number of atoms in side chains/total number of atoms in main chain) of at least 0.20.

In the following description, this fatty acid ester is also referred to as the fatty acid ester E, the total number of atoms in the main chain is also referred to as A, the total number of atoms in side chains is also referred to as B, and the ratio of (total number of atoms in side chains/total number of atoms in main chain) is also referred to as B/A.

This embodiment can improve the image quality of printed items, and can also prevent ink foaming. Moreover, the embodiment can also prevent the occurrence of ink mist when the ink is discharged from an inkjet nozzle.

In the ink according to one embodiment, by using a combination of a silicone oil and the fatty acid ester E, the surface density of printed items can be enhanced.

The silicone oil is a solvent that has comparatively low polarity, dissolves pigment dispersants relatively poorly, exhibits comparatively low surface tension, and penetrates readily into the interior of papers.

The fatty acid ester E is a solvent that has comparatively high polarity, dissolves pigment dispersants readily, exhibits comparatively high surface tension, and is readily retained on the surface of papers.

As a result of these properties, by including both the silicone oil and the fatty acid ester E in the ink, when the ink is discharged onto a paper, the silicone oil tends to penetrate into the interior of the paper, while the fatty acid ester E is retained at the paper surface. Because the pigment is largely contained in the fatty acid ester E together with the pigment dispersant, the pigment and the pigment dispersant tend to be retained at the paper surface together with the fatty acid ester E, enabling the surface density of the printed items to be further enhanced.

If the silicone oil is not included, then the fatty acid ester E gradually penetrates into the paper interior, meaning the pigment and the pigment dispersant also penetrate into the paper interior together with the fatty acid ester E, which can sometimes cause strike-through. In such cases, the strike-through tends to become more pronounced as time elapses after printing.

In the ink according to one embodiment, by ensuring that the ratio of (total number of atoms in side chains/total number of atoms in the main chain) for the fatty acid ester E is at least 0.20, ink foaming can be prevented when the fatty acid ester E is combined with the silicone oil.

Ink foaming can sometimes occur when two or more solvents having different surface tensions are used as a result of the difference in the surface tensions. Further, ink foaming also occurs more readily as a result of the liquid phase forming a thin film. The fatty acid ester E having a ratio of (total number of atoms in side chains/total number of atoms in the main chain) of at least 2.0 has a bulky molecular structure and is unlikely to form a thin film due to the degree of steric hindrance. By using this fatty acid ester E in combination with a silicone oil, foam generation can be prevented as a result of this steric hindrance provided by the fatty acid ester E, and the defoaming rate can also be increased for any foam that is generated.

In the ink according to one embodiment, the generation of ink mist when the ink is discharged from an inkjet nozzle can be prevented.

Silicone oils have a comparatively low surface tension, and therefore when the ink is discharged from an inkjet nozzle, a problem can sometimes arise where the ink disperses in a mist-like form, and the dispersed ink then adheres to and contaminates the inside of the printing device or the printed items. Particularly in those printing devices where the paper is transported at high speed, the generation of static electricity can cause the ink to disperse over a wide area in a mist-like form, making the problem of contamination particularly noticeable.

By using the fatty acid ester E that has a comparatively high surface tension in combination with the silicone oil, ink mist generation can be prevented. Further, because the fatty acid ester E has comparatively high polarity, it can suppress the generation of static electricity, thereby preventing the generation of ink mist.

The ink may contain a pigment.

Organic pigments such as azo pigments, phthalocyanine pigments, polycyclic pigments and dye lake pigments, and inorganic pigments such as carbon blacks and metal oxides may be used as the pigment. Examples of the azo pigments include soluble azo lake pigments, insoluble azo pigments and condensed azo pigments. Examples of the phthalocyanine pigments include metal phthalocyanine pigments such as copper phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. These pigments may be used individually, or a combination of two or more pigments may be used.

From the viewpoints of the discharge stability and the storage stability, the average particle size of the pigment particles in the ink, expressed as the volume-based average value in the particle size distribution measured by dynamic light scattering, is preferably not more than 300 nm, more preferably not more than 200 nm, and even more preferably 150 nm or less.

The amount of the pigment, relative to the total mass of the ink, is typically from 0.01 to 20% by mass, and from the viewpoints of the print density and the ink viscosity, is preferably from 1 to 15% by mass, and more preferably from 4 to 10% by mass.

In order to enable the pigment to be dispersed stably within the ink, a pigment dispersant may be used together with the pigment.

Examples of pigment dispersants that can be used favorably include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, copolymers of vinylpyrrolidone and long-chain alkenes, modified polyurethanes, modified polyacrylates, polyether ester anionic surfactants, polyoxyethylene alkyl phosphate esters, and polyester polyamines.

Examples of commercially available pigment dispersants include Antaron V216 (a vinylpyrrolidone-hexadecene copolymer) and V220 (a vinylpyrrolidone-eicosene copolymer) (both product names) manufactured by ISP Japan Ltd.; Solsperse 13940 (a polyester amine-based dispersant), 16000, 17000 and 18000 (fatty acid amine-based dispersants), and 11200, 24000 and 28000 (all product names) manufactured by The Lubrizol Corporation; Efka 400, 401, 402, 403, 450, 451 and 453 (modified polyacrylates) and Efka 46, 47, 48, 49, 4010 and 4055 (modified polyurethanes) (all product names) manufactured by BASF Japan Ltd.; DISPARLON KS-860 and KS-873N4 (polyester amine salts) (both product names) manufactured by Kusumoto Chemicals, Ltd.; DISCOL 202, 206, OA-202 and OA-600 (multi-chain polymeric nonionic dispersants) (all product names) manufactured by DKS Co., Ltd.; DISPERBYK 2155 and 9077 (both product names) manufactured by BYK-Chemie Japan K.K.; and Hypermer KD2, KD3, KD11 and KD12 (all product names) manufactured by Croda Japan K.K.

The amount of the pigment dispersant need only be sufficient to enable satisfactory dispersion of the pigment within the ink, and may be set as appropriate. For example, the pigment dispersant is typically added in a mass ratio within a range from 0.1 to 5, and preferably from 0.1 to 1, relative to a value of 1 for the pigment. Further, the pigment dispersant is typically added in an amount of 0.01 to 10% by mass, preferably 0.01 to 6% by mass, and even more preferably 0.1 to 6% by mass, relative to the total mass of the ink.

From the viewpoint of the coloring of the ink, a dye may be included in the ink together with the pigment.

Any of the dyes typically used in this technical field may be used as the dye. In oil-based inks, dyes exhibit favorable affinity with the non-aqueous solvent of the ink, thereby further improving the storage stability, and therefore the use of an oil-soluble dye is preferred.

Examples of oil-soluble dyes include azo dyes, metal complex salt dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metal phthalocyanine dyes. These dyes may be used individually, or a combination of a plurality of dyes may be used.

For the silicone oil, a compound which has both silicon atoms and carbon atoms within each molecule, and which is liquid at 23° C. may be used.

Examples of compounds that may be used as the silicone oil include compounds having a silyl group, compounds having a silyloxy group and compounds having a siloxane linkage, and polysiloxane compounds can be used particularly favorably.

A chain-like silicone oil, a cyclic silicone oil, or a modified silicone oil or the like may be used as the silicone oil.

The chain-like silicone oil is preferably a chain-like polysiloxane having 2 to 30 silicon atoms. The number of silicon atoms in the chain-like silicone oil is more preferably from 2 to 20, and even more preferably from 3 to 10.

Examples of the chain-like silicone oil include linear dimethyl silicone oils such as tetradecamethylhexasiloxane, hexadecamethylheptasiloxane and docosamethyldecasiloxane, and branched dimethyl silicone oils such as methyltris(trimethylsiloxy)silane and tetrakis(trimethylsiloxy)silane.

The cyclic silicone oil is preferably a cyclic polysiloxane of 5 to 9 silicon atoms, and cyclic dimethyl silicone oils such as decamethylcyclopentasiloxane, dodecamethylcyclohexasiloxane, hexadecamethylcyclooctasiloxane and octadecamethylcyclononasiloxane can be used favorably.

For the modified silicone oil, a silicone oil obtained by introducing any of various organic groups at a portion of the silicon atoms of a chain-like or cyclic dimethyl silicone oil can be used. In the modified silicone oil, it is preferable that all of the silicon atoms are bonded only to carbon atoms or oxygen atoms of siloxane linkages. The modified silicone oil is preferably an unreactive silicone oil. The modified silicone oil is preferably composed only of silicon atoms, carbon atoms, oxygen atoms and hydrogen atoms.

Examples of the modified silicone oil include alkyl-modified silicone oils, aryl-modified silicone oils such as phenyl-modified silicone oils or aralkyl-modified silicone oils, carboxylate ester-modified silicone oils, alkylene-modified silicone oils, and polyether-modified silicone oils. Of these, an alkyl-modified silicone oil or carboxylate ester-modified silicone oil is preferred, and an alkyl-modified silicone oil is particularly desirable.

The modified silicone oil preferably contains 2 to 20 silicon atoms, more preferably 2 to 10 silicon atoms, even more preferably 2 to 6 silicon atoms, and still more preferably 2 to 5 silicon atoms.

One example of the modified silicone oil is a silicone oil having 2 to 6 silicon atoms per molecule, and having an organic group in which a carbon atom is bonded directly to a silicon atom and in which the total number of carbon atoms and oxygen atoms is at least 4. Hereafter, this silicone oil is sometimes referred to as "the modified silicone oil S".

The modified silicone oil S may contain at least one group selected from the group consisting of groups (A) to (D) described below as the organic group in which the total number of carbon atoms and oxygen atoms is at least 4.

(A) Alkyl groups having at least 4 carbon atoms.
(B) Carboxylate ester linkage-containing groups in which the total number of carbon atoms and oxygen atoms is at least 4.
(C) Aromatic ring-containing groups having at least 6 carbon atoms.
(D) Alkylene groups having at least 4 carbon atoms.

In the modified silicone oil S, the total number of carbon atoms and oxygen atoms contained within all of the organic groups in which the total number of carbon atoms and oxygen atoms is at least 4 is preferably from 4 to 20, more preferably from 4 to 16, and even more preferably from 6 to 12, per molecule.

In those cases where one molecule of the modified silicone oil S contains two or more of the organic groups in which the total number of carbon atoms and oxygen atoms is at least 4, the total number of carbon atoms and oxygen atoms, in one molecule, that are contained within all of the organic groups in which the total number of carbon atoms and oxygen atoms is at least 4 refers to the total number of carbon atoms and oxygen atoms contained in the two or more organic groups each having a total number of carbon atoms and oxygen atoms of at least 4.

Examples of the modified silicone oil S include silicone oils that are compounds represented by general formula (X) shown below.

[Chemical formula 1]

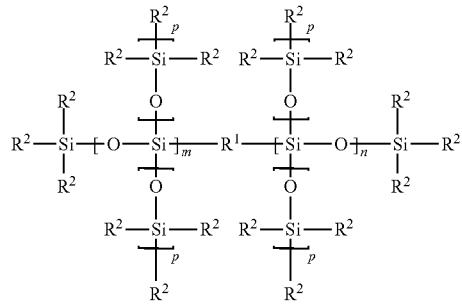

General formula (X)

In general formula (X), $R^1$ represents an oxygen atom or a divalent organic group having a carbon atom bonded directly to each silicon atom, each $R^2$ independently represents a monovalent organic group having a carbon atom bonded directly to the silicon atom, each of m and n independently represents an integer of 0 to 4, each p independently represents an integer of 0 to 2, the number of silicon atoms within one molecule is from 2 to 6, at least one of $R^1$ and $R^2$ is an organic group in which the total number of carbon atoms and oxygen atoms is at least 4, and the total number of carbon atoms and oxygen atoms contained within all of the organic groups in which the total number of carbon atoms and oxygen atoms is at least 4 is from 4 to 20 per molecule.

In general formula (X), it is preferable that $R^1$ is an oxygen atom or a divalent organic group in which the total number of carbon atoms and oxygen atoms is at least 4, and each $R^2$ independently represents a methyl group or a monovalent organic group in which the total number of carbon atoms and oxygen atoms is at least 4.

It is preferable that in general formula (X), $R^1$ is an oxygen atom or an alkylene group having at least 4 carbon atoms, and each $R^2$ independently represents a methyl group, an alkyl group having at least 4 carbon atoms, a carboxylate ester linkage-containing group in which the total number of carbon atoms and oxygen atoms is at least 4, or an aromatic ring-containing group having at least 6 carbon atoms, wherein at least one group among $R^1$ and $R^2$ is a group selected from the group consisting of alkylene groups having at least 4 carbon atoms, alkyl groups having at least 4 carbon atoms, carboxylate ester linkage-containing groups in which the total number of carbon atoms and oxygen atoms is at least 4, and aromatic ring-containing groups having at least 6 carbon atoms, and the total number of carbon atoms and oxygen atoms in one molecule that are contained within all of the alkylene groups having at least 4 carbon atoms, alkyl groups having at least 4 carbon atoms, carboxylate ester linkage-containing groups in which the total number of carbon atoms and oxygen atoms is at least 4, and aromatic ring-containing groups having at least 6 carbon atoms, is from 4 to 20.

In the modified silicone oil S, the alkyl group having at least 4 carbon atoms may have a straight chain or a branched chain, and may be chain-like or alicyclic.

The number of carbon atoms in this alkyl group is preferably at least 4, more preferably at least 6, and even more preferably 10 or greater.

The number of carbon atoms in this alkyl group is preferably not more than 20, more preferably not more than 16, and even more preferably 12 or fewer.

Examples of the alkyl group having at least 4 carbon atoms include an n-butyl group, isobutyl group, tert-butyl group, pentyl group, hexyl group, heptyl group, octyl group, isooctyl group, nonyl group, decyl group, dodecyl group, hexadecyl group and eicosyl group.

In the modified silicone oil S, for the carboxylate ester linkage-containing group, a group represented by —$R^{Bb}$—O—(CO)—$R^{Ba}$ or a group represented by —$R^{Bb}$—(CO)—O—$R^{Ba}$, in which the carboxylate ester linkage is bonded to a silicon atom of a siloxane linkage in the main chain via an alkylene group, can be used particularly favorably.

Here, $R^{Ba}$ may have a straight chain or branched chain having at least 1 carbon atom, and is preferably a chain-like or alicyclic alkyl group. Further, $R^{Bb}$ may have a straight chain or branched chain having at least 1 carbon atom, and is preferably a chain-like or alicyclic alkylene group. The alkylene group linking the silicon atom of the siloxane linkage in the main chain and the carboxylate ester linkage more preferably has at least 2 carbon atoms.

The total number of carbon atoms and oxygen atoms in the carboxylate ester linkage-containing group is the total of the one carbon atom and two oxygen atoms in the ester linkage (—O—(CO)—), the number of carbon atoms in the alkyl group ($R^{Ba}$), and the number of carbon atoms in the alkylene group ($R^{Bb}$).

In the carboxylate ester linkage-containing group, examples of the alkyl group ($R^{Ba}$) include a methyl group, ethyl group, propyl group, isopropyl group, n-butyl group, isobutyl group, tert-butyl group, pentyl group, hexyl group, heptyl group, octyl group, isooctyl group, nonyl group, decyl group, dodecyl group, tridecyl group, hexadecyl group and heptadecyl group.

Preferred alkyl groups include a propyl group, pentyl group, heptyl group, nonyl group, dodecyl group and tridecyl group, and a heptyl group or nonyl group is particularly preferred.

In the carboxylate ester linkage-containing group, the alkylene group ($R^{Bb}$) is preferably a linear alkylene group of 1 to 8 carbon atoms, and examples include a methylene group, ethylene group, propylene group, trimethylene group, n-butylene group, isobutylene group, pentylene group, hex- ylene group, heptylene group, octylene group and isooctylene group. An ethylene group is preferred.

In the modified silicone oil S, for the aromatic ring-containing group, a group represented by —$R^{Ca}$ in which the aromatic ring is bonded directly to a silicon atom of a siloxane linkage in the main chain, or a group represented by —$R^{Cb}$—$R^{Ca}$, in which the aromatic ring is bonded to a silicon atom of a siloxane linkage in the main chain via an alkylene group, can be used particularly favorably.

Here, $R^{Ca}$ is preferably an aromatic ring having at least 6 carbon atoms. Further, $R^{Cb}$ may have a straight chain or branched chain having at least 1 carbon atom, and is preferably a chain-like or alicyclic alkylene group.

When the aromatic ring-containing group is a group represented by —$R^{Ca}$ in which the aromatic ring is bonded directly to a silicon atom of a siloxane linkage in the main chain, it is preferable that a branched chain such as a trimethylsilyloxy group branches from the siloxane linkage of the main chain as a side chain. It is even more preferable that the aromatic ring-containing group is a group represented by —$R^{Cb}$—$R^{Ca}$ in which the aromatic ring is bonded to a silicon atom of a siloxane linkage in the main chain via an alkylene group.

The number of carbon atoms in the aromatic ring-containing group is the total of the number of carbon atoms in the aromatic ring ($R^{Ca}$) and the number of carbon atoms in the optional alkylene group ($R^{Cb}$).

In the aromatic ring-containing group, examples of the aromatic ring portion ($R^{Ca}$) include a phenyl group, tolyl group, xylyl group, trimethylphenyl group, biphenylyl group, naphthyl group or anthracenyl group, or a functional group in which at least one hydrogen atom of one of these groups has been substituted with an alkyl group.

In the aromatic ring-containing group, the optional alkylene group ($R^{Cb}$) is preferably an alkylene group of 1 to 8 carbon atoms that may have a straight chain or a branched chain, and examples include a methylene group, ethylene group, propylene group, trimethylene group, n-butylene group, isobutylene group, pentylene group, hexylene group, heptylene group, octylene group and isooctylene group.

A propylene group, methylethylene group or ethylene group is preferred.

Furthermore, examples of compounds that may be used as the modified silicone oil S having an aromatic ring-containing group include methyl phenyl silicones such as diphenyl dimethicone, trimethylsiloxyphenyl dimethicone, phenyl trimethicone, diphenylsiloxyphenyl trimethicone, trimethylpentaphenyltrisiloxane, and 1,1,1,5,5,5-hexamethyl-3-phenyl-3-(trimethylsilyloxy)trisiloxane.

One embodiment of the modified silicone oil S is a compound having 2 to 6 silicon atoms and an alkylene group of at least 4 carbon atoms, and is preferably a compound in which a silyl group or at least one siloxane linkage is bonded to the carbon atom at each of the two terminals of an alkylene group having at least 4 carbon atoms.

Examples of the alkylene group of at least 4 carbon atoms include an n-butylene group, isobutylene group, pentylene group, hexylene group, heptylene group, octylene group, isooctylene group, nonylene group, decylene group, dodecylene group, hexadecylene group and eicosylene group.

An octylene group, decylene group or dodecylene group is preferred, and an octylene group or decylene group is particularly desirable.

The modified silicone oil S described above can be produced using the method described below, but the invention is not restricted to this particular method.

For example, the modified silicone oil S can be obtained by reacting a siloxane raw material with a reactive compound having both an organic group in which the total number of carbon atoms and oxygen atoms is at least 4 and a reactive group, in an organic solvent. The siloxane raw material and the reactive compound are preferably reacted so that the molar ratio between the reactive groups of the siloxane raw material and the reactive groups of the reactive compound is within a range from 1:1 to 1:1.5. Further, during the reaction, a catalyst such as a platinum catalyst like a zero-valent platinum olefin complex, a zero-valent platinum vinylsiloxane complex, a divalent platinum olefin complex halide or platinic chloride can be used favorably.

Examples of compounds that can be used as the siloxane raw material include 1,1,1,3,5,5,5-heptamethyltrisiloxane, 1,1,1,3,3,5,7,7,7-nonamethyltetrasiloxane, 1,1,1,3,3,5,7,7,9,9,9-undecamethylpentasiloxane, pentamethyldisiloxane, 1,1,3,3,5,5,5-heptamethyltrisiloxane, 1,1,3,3-tetramethyldisiloxane, 1,1,3,3,5,5-hexamethyltrisiloxane, 1,1,3,3,5,5,7,7-octamethyltetrasiloxane, 1,1,3,3,5,5,7,7,9,9-decamethylpentasiloxane, 1,1,1,5,5,5-hexamethyl-3-(trimethylsilyloxy)trisiloxane, 1,1,1,5,5,5-hexamethyltrisiloxane, 1,1,1,3,5,7,7,7-octamethyltetrasiloxane, 1,1,3,5,5-pentamethyl-3-(dimethylsilyloxy)trisiloxane, and 1,1,3,3,5,5,7,7,9,9,11,11-dodecamethylhexasiloxane.

The reactive compound preferably contains a carbon double bond as the reactive group.

Examples of reactive compounds that can be used for introducing an alkyl group into the modified silicone oil S include alkenes having at least 4 carbon atoms, such as 1-butene, 2-butene, 1-pentene, 1-hexene, 1-heptene, 1-octene, 2-octene, 1-nonene, 1-decene, 1-dodecene, 1-hexadecene and 1-eicosene.

Further, besides alkenes, alicyclic hydrocarbons having an ethylenic unsaturated double bond such as vinylcyclohexane can also be used.

Examples of reactive compounds that can be used for introducing an ester linkage-containing group into the modified silicone oil S include vinyl esters of fatty acids and allyl esters of fatty acids in which the total number of carbon atoms and oxygen atoms is at least 6, such as vinyl acetate, vinyl propionate, vinyl butyrate, vinyl isobutanoate, vinyl pentanoate, vinyl pivalate, vinyl hexanoate, vinyl heptanoate, vinyl 2-ethylhexanoate, vinyl octanoate, vinyl isooctanoate, vinyl nonanoate, vinyl decanoate, vinyl laurate, vinyl myristate, vinyl palmitate, vinyl eicosanoate and allyl hexanoate.

Examples of reactive compounds that can be used for introducing an aromatic ring-containing group into the modified silicone oil S include aryl compounds having a vinyl bond and an aromatic ring of at least 6 carbon atoms, such as styrene, 4-methylstyrene, 2-methylstyrene, 4-tert-butylstyrene, allylbenzene, 1-allylnaphthalene, 4-phenyl-1-butene, 2,4-diphenyl-4-methyl-1-pentene, 1-vinylnaphthalene, α-methylstyrene, 2-methyl-1-phenylpropene, 1,1-diphenylethylene, triphenylethylene, 2,4,6-trimethylstyrene, cis-β-methylstyrene, trans-β-methylstyrene, and 3-phenyl-1-propene.

Examples of reactive compounds that can be used for introducing an alkylene group into the modified silicone oil S include diene compounds having at least 4 carbon atoms, such as 1,3-butadiene, 1,3-pentadiene, 1,4-pentadiene, 1,5-hexadiene, 1,6-heptadiene, 1,7-octadiene, 1,8-nonadiene, 1,9-decadiene, 1,11-dodecadiene, 1,10-undecadiene, 1,13-tetradecadiene, hexadecadiene, and eicosadiene.

Commercially available products may also be used as the silicone oil, and examples of products that may be used include "KF-96L-5CS", "KF-96A-6CS", "KF-96-10CS" and "KF-56A" manufactured by Shin-Etsu Chemical Co., Ltd., "DC246 Fluid" and "FZ-3196" manufactured by Dow Corning Toray Co., Ltd., and 1,1,1,5,5,5-hexamethyl-3-phenyl-3-(trimethylsilyloxy)trisiloxane, hexamethylcyclotrisiloxane, octamethylcyclotetrasiloxane, decamethylcyclopentasiloxane and dodecamethylcyclohexasiloxane manufactured by Tokyo Chemical Industry Co., Ltd.

There are no particular limitations on the amount of the silicone oil relative to the total mass of the ink, and any amount of 10% by mass or more may be included.

The amount of the silicone oil relative to the total mass of the ink is preferably at least 20% by mass, more preferably at least 30% by mass, and even more preferably 40% by mass or greater. Such an amount ensures that the silicone oil of lower surface tension penetrates rapidly into the paper, while the fatty acid ester E, the pigment and the pigment dispersant are retained at the paper surface, thus enabling further improvements in the surface image density and the level of strike-through.

Further, the amount of the silicone oil relative to the total mass of the ink is preferably not more than 90% by mass, and more preferably 80% by mass or less.

The blend amount of the silicone oil relative to the total mass of non-aqueous solvent may be within a range from 10 to 90% by mass, and may be from 20 to 80% by mass.

The non-aqueous solvent may contain a fatty acid ester having 10 to 40 carbon atoms per molecule and having a ratio of (total number of atoms in side chains/total number of atoms in main chain) of at least 0.20 (the fatty acid ester E).

By using this fatty acid ester E in combination with the silicone oil, ink foaming can be prevented, the generation of ink mist can be prevented, and the image density and strike-through can be improved.

In the fatty acid ester E, the ratio B/A that represents the ratio of (total number of atoms in side chains (B)/total number of atoms in the main chain (A)) is preferably at least 0.20, more preferably at least 0.25, and even more preferably 0.30 or greater. This ensures that the molecular structure of the fatty acid ester E has greater bulk, and therefore when the fatty acid ester E is used in combination with the silicone oil, ink foaming can be prevented by the steric hindrance provided by the molecular structure of the fatty acid ester E.

In the fatty acid ester E, although the upper limit for B/A is not particularly limited, B/A is preferably not more than 0.8, and more preferably 0.5 or less.

Here, the main chain of the fatty acid ester means the atomic chain having the largest number of atoms within the atomic chain formed by linearly bonding the ester linkage portion [—COO—], the carbon chain of the fatty acid portion bonded to the ester linkage, and the carbon chain of the alcohol portion bonded to the ester linkage. The number of atoms in the atomic chain includes the one carbon atom and one oxygen atom bonded linearly within the ester linkage. Side chains that branch from this main chain are deemed side chains. Further, the one oxygen atom of the carbonyl group [—C(═O)—] in the ester linkage is deemed a side chain.

Further, in the fatty acid ester, in those cases where a plurality of atomic chains exist that have the largest number of atoms, the atomic chain having the largest number of side chain atoms is deemed the main chain.

Furthermore, in the fatty acid ester, in those cases where a plurality of atomic chains exist that have the largest number of atoms, and the number atoms in the side chains of each of the plurality of atomic chains is the same, the atomic chain having the lowest number of side chains is deemed the main chain.

The number of atoms in the main chain and the number of atoms in the side chains do not include hydrogen atoms.

Examples of the fatty acid ester E include compounds represented by general formula (1) shown below.

$R^1$—COO—$R^2$    General formula (1)

In general formula (1), each of $R^1$ and $R^2$ independently represents an alkyl group, and the alkyl group of at least one of $R^1$ and $R^2$ is a branched alkyl group having a side chain.

Compounds in which one of $R^1$ and $R^2$ is a linear alkyl group and the other of $R^1$ and $R^2$ is a branched alkyl group may be used. Further, compounds in which $R^1$ and $R^2$ are both branched alkyl groups may also be used.

The side chain incorporated within at least one of $R^1$ and $R^2$ may have at least one carbon atom, preferably has at least two carbon atoms, more preferably has at least three carbon atoms, and still more preferably has 4 or more carbon atoms. This ensures that the steric hindrance provided by the fatty acid ester E is able to prevent foaming of the ink.

Further, although there are no particular limitations on the side chain incorporated within at least one of $R^1$ and $R^2$, the side chain may have 12 or fewer carbon atoms, and preferably has 10 or fewer carbon atoms, and even more preferably 8 or fewer carbon atoms. The side chain incorporated within at least one of $R^1$ and $R^2$ may include further branching and itself have a side chain.

Examples of the side chain in the fatty acid ester E include a methyl group, ethyl group, propyl group, isopropyl group, n-butyl group, isobutyl group, tert-butyl group, pentyl group, hexyl group, heptyl group, octyl group, isooctyl group, nonyl group, decyl group and dodecyl group.

Preferred side chains include an n-butyl group, hexyl group and octyl group, and an n-butyl group or a hexyl group is particularly desirable.

In those cases where at least one of $R^1$ and $R^2$ is a branched alkyl group, the number of carbon atoms in the main chain of each branched alkyl group is, independently, preferably at least 6, and more preferably 8 or more.

The number of carbon atoms in the main chain of each branched alkyl group is, independently, preferably not more than 13, more preferably not more than 12, and even more preferably 10 or fewer.

The total number of carbon atoms in the branched alkyl group is preferably from 4 to 30, more preferably from 6 to 20, and even more preferably from 8 to 18.

In those cases where at least one of $R^1$ and $R^2$ is a linear alkyl group, the total number of carbon atoms in the linear alkyl group is preferably from 1 to 30, more preferably from 6 to 20, and even more preferably from 8 to 18.

The number of carbon atoms in the side chain(s) and the number of carbon atoms in the main chains of $R^1$ and $R^2$ may be adjusted in accordance with the length of the respective main chains, the number of carbon atoms in the side chains, and the number of carbon atoms in the entire fatty acid ester E.

The number of carbon atoms per molecule of the fatty acid ester E is preferably at least 10, more preferably at least 12, and even more preferably 16 or more. This ensures that the molecular structure of the fatty acid ester has sufficient bulk to enable better prevention of foam generation.

Further, the number of carbon atoms per molecule of the fatty acid ester E is preferably not more than 40, more preferably not more than 30, even more preferably not more than 25, and still more preferably 23 or fewer. As the number of carbon atoms is increased, the viscosity can sometimes increase, and therefore by ensuring that the number of carbon atoms in the fatty acid ester E satisfies this range, the viscosity of the ink can be kept low, and the dischargeability can be improved.

By ensuring that the number of carbon atoms per molecule of the fatty acid ester E is 23 or fewer, strike-through in the printed items can be better prevented. Because fatty acid esters having a large number of carbon atoms tend to have comparatively low volatility, they tend to be resistant to volatilization from the paper following printing, and instead penetrate in from the paper surface and are retained in the interior of the paper. In a state where the fatty acid ester is retained in the paper, the refractive index relationship means that the paper appears somewhat transparent, meaning strike-through of the printed items can become more noticeable and problematic.

Specific examples of the fatty acid ester E include 1-butylhexyl acetate, 2-ethylhexyl 2-ethylhexanoate, 2-hexyldecyl 2-ethylhexanoate, hexyl 2-butyloctanoate, octyl 2-butyloctanoate, 2-ethylhexyl 2-butyloctanoate, decyl 2-butyloctanoate, 2-hexyldecyl hexanoate, 2-hexyldecyl heptanoate, 1-hexyloctyl octanoate, 2-butyloctyl octanoate, 2-hexyldecyl octanoate, 2-hexyldecyl 2-ethylhexanoate, 2-butyloctyl nonanoate, 1-hexyloctyl nonanoate, 3,5,5-trimethylhexyl 3,5,5-trimethylhexanoate, 11-methyldodecyl 3,5,5-trimethylhexanoate, 1-butylhexyl decanoate, 2-butyloctyl decanoate, 2-octyldodecyl decanoate, nonyl 2-butyloctanoate, 1-butylhexyl 2-butyloctanoate, and hexyl 2-hexyldecanoate.

These esters may be used individually, or a combination of two or more esters may be used.

The fatty acid ester E can be produced using the method described below, but the invention is not restricted to this particular method.

The fatty acid ester E can be obtained by reacting a fatty acid and an alcohol. A compound having a side chain is used for at least one of the fatty acid and the alcohol used as raw materials. Further, in order to introduce a side chain into the alcohol portion of the fatty acid ester E, a secondary alcohol of 3 or more carbon atoms may be used.

The reaction temperature may be adjusted within a range from 80 to 230° C. in accordance with the type of fatty acid and alcohol being used. The reaction time may be adjusted within a range from 1 to 48 hours in accordance with the type of fatty acid and alcohol, and the amounts used of the raw materials. The water produced during the esterification reaction is preferably removed.

The fatty acid and the alcohol are preferably reacted in a molar ratio of 1:1.

During the reaction, an appropriate amount of a catalyst such as concentrated sulfuric acid, p-toluenesulfonic acid or methanesulfonic acid may be used.

Examples of fatty acids having a side chain that may be used as a raw material include 2-ethylhexanoic acid, isononanoic acid, 2-butyloctanoic acid, 2-hexyldecanoic acid and 2-octyldodecanoic acid.

Examples of linear fatty acids that may be used as a raw material include acetic acid, butanoic acid, pentanoic acid, hexanoic acid, heptanoic acid, octanoic acid, nonanoic acid, decanoic acid, undecanoic acid, dodecanoic acid and tetradecanoic acid.

Examples of alcohols having a side chain that may be used as a raw material include 2-ethylhexanol, isononanol, 2-butyl-1-octanol, isotridecanol, 2-hexyl-1-decanol and 2-octyl-1-dodecanol.

Examples of secondary alcohols that may be used as a raw material include 5-decanol and 7-tetradecanol.

Examples of linear alcohols that may be used as a raw material include 1-butanol, 1-pentanol, 1-hexanol, 1-heptanol, 1-octanol, 1-nonanol, 1-decanol, 1-undecanol and 1-dodecanol.

There are no particular limitations on the amount of the fatty acid ester E relative to the total mass of the ink, and any amount of 10% by mass or more may be included.

From the viewpoints of increasing the surface tension of the overall non-aqueous solvent and preventing the generation of ink mist, the amount of the fatty acid ester E relative to the total mass of the ink is preferably at least 20% by mass, more preferably at least 30% by mass, and even more preferably 40% by mass or greater.

Further, the amount of the fatty acid ester E relative to the total mass of the ink is preferably not more than 90% by mass, and more preferably 80% by mass or less.

The blend amount of the fatty acid ester E relative to the total mass of non-aqueous solvent may be within a range from 10 to 90% by mass, and may be from 20 to 80% by mass.

The amount of the fatty acid ester E relative to the amount of the silicone oil [(amount of the fatty acid ester E)/(amount of the silicone oil)] is preferably within a range from 0.1 to 10, and more preferably from 0.5 to 5. At a ratio within this range, an appropriate amount of the silicone oil penetrates into the interior of the paper, while the pigment and the pigment dispersant can be retained in appropriate amounts together with the fatty acid ester E on the paper surface. Further, the surface tension of the overall ink can be enhanced, enabling the generation of ink mist to be better prevented.

The ink may also contain other non-aqueous solvents.

Non-polar organic solvents and polar organic solvents may both be used as the other non-aqueous solvent. In one embodiment, a water-insoluble organic solvent that does not mix uniformly with an equal volume of water at 1 atmosphere and 20° C. is preferably used as the other non-aqueous solvent.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JXTG Nippon Oil & Energy Corporation), Isopar G, Isopar H, Isopar L, Isopar M, Exxsol D40, Exxsol D60, Exxsol D80, Exxsol D95, Exxsol D110 and Exxsol D130 (all manufactured by Exxon Mobil Corporation); and MORESCO White P-40, MORESCO White P-60, MORESCO White P-70, MORESCO White P-80, MORESCO White P-100, MORESCO White P-120, MORESCO White P-150, MORESCO White P-200, MORESCO White P-260 and MORESCO White P-350P (all manufactured by MORESCO Corporation).

Examples of preferred aromatic hydrocarbon solvents include Grade Alkene L and Grade Alkene 200P (both manufactured by JXTG Nippon Oil & Energy Corporation), and Solvesso 100, Solvesso 150, Solvesso 200 and Solvesso 200ND (all manufactured by Exxon Mobil Corporation).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of preferred polar organic solvents include other fatty acid ester-based solvents besides the fatty acid ester E, higher alcohol-based solvents and higher fatty acid-based solvents.

Specific examples of the other fatty acid ester-based solvents include solvents having a total of at least 12 carbon atoms, and preferably 16 to 30 carbon atoms within one molecule. Examples of such solvents include fatty acid ester-based solvents having linear alkyl groups such as methyl laurate, hexyl laurate, hexyl palmitate, methyl oleate, ethyl oleate, butyl oleate, hexyl oleate, methyl linoleate, ethyl linoleate, butyl stearate, hexyl stearate, hexyl stearate, methyl soybean oil and methyl tallate; and fatty acid ester-based solvents in which the number of carbon atoms in side chains is small relative to the number of atoms in the main chain, such as 2-ethylhexyl palmitate, isopropyl laurate, isopropyl myristate, isopropyl palmitate, isooctyl palmitate, isopropyl oleate, isobutyl linoleate, isooctyl stearate, isobutyl soybean oil, and isobutyl tallate.

Specific examples of the higher alcohol-based solvents include higher alcohol-based solvents having at least 6 carbon atoms, and preferably 12 to 20 carbon atoms, within one molecule, such as isomyristyl alcohol, isopalmityl alcohol, isostearyl alcohol, oleyl alcohol, isoeicosyl alcohol and decyltetradecanol.

Specific examples of the higher fatty acid-based solvents include higher fatty acid-based solvents having at least 12 carbon atoms, and preferably 14 to 20 carbon atoms, within one molecule, such as lauric acid, isomyristic acid, palmitic acid, isopalmitic acid, α-linolenic acid, linoleic acid, oleic acid and isostearic acid.

The boiling point of these polar organic solvents such as the fatty acid ester-based solvents, higher alcohol-based solvents and higher fatty acid-based solvents is preferably at least 150° C., more preferably at least 200° C., and even more preferably 250° C. or higher. These non-aqueous solvents having a boiling point of 250° C. or higher also include non-aqueous solvents that do not exhibit an actual boiling point.

These non-aqueous solvents may be used individually, or combinations of two or more solvents may be used provided they form a single phase.

In those cases where another non-aqueous solvent is used besides the silicone oil and the fatty acid ester E, the amount of that other non-aqueous solvent relative to the total mass of the ink is preferably not more than 50% by mass, more preferably not more than 20% by mass, and even more preferably 10% by mass or less.

In terms of other fatty acid esters, the amount of fatty acid esters for which B/A is less than 0.2 is preferably limited. The amount of fatty acid esters for which B/A is less than 0.2 is, for example, preferably limited to 0% to 10% by mass relative to the total mass of the ink.

In addition to the various components described above, the oil-based ink may also contain various additives, provided these additives do not impair the effects of the present invention. For example, additives such as nozzle blockage inhibitors, antioxidants, conductivity adjusters, viscosity adjusters, surface tension adjusters, and oxygen absorbers and the like may be added as appropriate. There are no particular limitations on the types of these additives, and materials typically used in this technical field may be used.

The ink can be produced by mixing the various components including the colorant and the non-aqueous solvent. The ink is preferably produced by mixing and stirring the components together, either in a single batch or in a number of separate batches. Specifically, the ink can be produced by dispersing all of the components in a dispersion device such as a beads mill, either in a single batch or in a number of separate batches, and then, if desired, passing the resulting dispersion through a filtration device such as a membrane filter.

The ideal range for the ink viscosity for use as an oil-based inkjet ink varies depending on factors such as the diameter of the nozzles within the discharge head and the discharge environment, but generally, the viscosity at 23° C. is preferably within a range from 5 to 30 mPa·s, more preferably from 5 to 15 mPa·s, and even more preferably from 8 to 13 mPa·s.

There are no particular limitations on the printing method used with the inkjet ink, and any of various printing systems, including a piezo system, electrostatic system or thermal system may be used. In those cases where an inkjet recording device is used, the ink according to an embodiment of the present invention is preferably discharged from the inkjet head based on a digital signal, with the discharged ink droplets being adhered to a recording medium.

In one embodiment, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or a coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

Further, in terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

EXAMPLES

The present invention is described below in further detail using a series of examples. The present invention is in no way limited by the following examples.

[Synthesis of Fatty Acid Esters]

The formulations of synthesized fatty acid esters are shown in Table 1.

A fatty acid and an alcohol were placed in a four-neck flask in accordance with the formulation shown in Table 1, and were then mixed and stirred to obtain a uniform solution. The four-neck flask was fitted with a Dean-Stark apparatus to enable removal of the water that was generated as the raw materials reacted. An appropriate amount of sulfuric acid was added as a catalyst to the four-neck flask containing the uniform solution, and the entire system was then heated. The heating temperature was set within a range from 80° C. to 230° C. in accordance with the types of fatty acid and alcohol being reacted. The heated reaction time was set within a range from 1 to 48 hours. Following reaction, in order to remove any unreacted raw materials and impurities, the obtained solution was distilled under reduced pressure to obtain the target fatty acid ester.

The fatty acid and the alcohol were mixed in a molar ratio of 1:1.

The fatty acids and the alcohols can be obtained from Tokyo Chemical Industry Co., Ltd. and Sigma-Aldrich Corporation.

The following commercially available fatty acid esters were also used.

Hexyl laurate: EXCEPARL HL, manufactured by Kao Corporation

2-Ethylhexyl palmitate: IOP, manufactured by Kokyu Alcohol Kogyo Co., Ltd.

2-Hexyldecyl 2-ethylhexanoate: ICEH, manufactured by Kokyu Alcohol Kogyo Co., Ltd.

TABLE 1

Synthesis formulations for fatty acid esters

| Fatty acid ester | Fatty acid name | Alcohol name |
|---|---|---|
| 2-ethylhexyl 2-ethylhexanoate | 2-ethylhexanoic acid | 2-ethylhexanol |
| octyl 2-butyloctanoate | 2-butyloctanoic acid | 1-octanol |
| 2-ethylhexyl 2-butyloctanoate | 2-butyloctanoic acid | 2-ethylhexanol |
| decyl 2-butyloctanoate | 2-butyloctanoic acid | 1-decanol |
| 2-hexyldecyl heptanoate | heptanoic acid | 2-hexyl-1-decanol |
| 2-hexyldecyl octanoate | octanoic acid | 2-hexyl-1-decanol |
| 2-octyldodecyl decanoate | decanoic acid | 2-octyl-1-dodecanol |

[Synthesis of Silicone Oils]

The formulations of synthesized silicone oils are shown in Table 2. Details of the synthesized silicone oils that were obtained are shown in Table 3.

A four-necked flask was charged with 50 parts by mass of hexane, and a siloxane compound and a reactive compound were then added in accordance with the blend amounts shown in the table. Subsequently, 0.02 parts by mass of a platinum catalyst (1,3-divinyl-1,1,3,3-tetramethyldisiloxane platinum complex, manufactured by Sigma-Aldrich Corporation) was added dropwise to the flask, and the resulting mixture was then stirred at room temperature for 2 to 3 hours. Subsequently, the reaction solvent (hexane) and any unreacted raw materials were removed by distillation under reduced pressure to obtain the target substance. In the synthesis of each of the modified silicones, the siloxane compound and the reactive compound were added in a molar ratio of 1:1.1.

The siloxane compounds were obtained from Gelest, Inc., and the reactive compounds were obtained from Tokyo Chemical Industry Co., Ltd.

Further, the following commercially available silicone oils were also used.

Dimethyl silicone "KF-96L-5CS": manufactured by Shin-Etsu Chemical Co., Ltd.

Dimethyl silicone "KF-96-10CS": manufactured by Shin-Etsu Chemical Co., Ltd.

Alkyl-modified silicone "FZ-3196": manufactured by Dow Corning Toray Co., Ltd.

TABLE 2

Synthesis formulations for silicone oils

| | Siloxane compound (parts by mass) | | Reactive compound (parts by mass) | |
|---|---|---|---|---|
| | Compound name | Amount (parts by mass) | Compound name | Amount (parts by mass) |
| Alkyl-modified silicone oil (1) | (trimethylsilyloxy)dimethylsilane | 10 | 1-hexadecene | 16.6 |
| Alkyl-modified silicone oil (2) | 3-[(dimethylsilyl)oxy]-1,1,3,5,5-pentamethyltrisiloxane | 10 | 1-butene | 6.9 |
| Alkyl-modified silicone oil (3) | 1,1,3,3,5,5,7,7,9,9-decamethylpentasiloxane | 10 | 1-butene | 3.5 |

TABLE 3

Details of silicone oils

| | Number of Si atoms | Numbers of carbon atoms in alkyl groups | | |
|---|---|---|---|---|
| | | $R^1$ | $R^2$ | $R^3$ |
| Alkyl-modified silicone (1) | 2 | 16 | — | — |
| Alkyl-modified silicone (2) | 4 | 4 | 4 | 4 |
| Alkyl-modified silicone (3) | 5 | 4 | 4 | — |

[Preparation of Inks]

Ink formulations are shown in Table 4, Table 5 and Table 6. For each fatty acid ester, the number of carbon atoms (C number) per molecule, the number of atoms A in the main chain, the number of atoms B in side chains, and the ratio (B/A) of (number of atoms in side chains/number of atoms in the main chain) are shown in each of the tables.

The pigments, pigment dispersants and solvents shown were mixed together in accordance with the blend amounts shown in each table, and the pigment was dispersed thoroughly using a beads mill (Dyno-Mill KDL-A, manufactured by Shinmaru Enterprises Corporation) under conditions including a residence time of 15 minutes. Subsequently, coarse particles were removed using a membrane filter to obtain an ink.

Other components used were as follows.

(Pigments)

Carbon black "MA77": manufactured by Mitsubishi Chemical Corporation

Carbon black "NEROX500": manufactured by Evonik Japan Co., Ltd.

(Pigment Dispersants)

Solsperse 18000: manufactured by The Lubrizol Corporation, active ingredient: 100% by mass Solsperse 13940: manufactured by The Lubrizol Corporation, active ingredient: 40% by mass (Hydrocarbon Solvents)

Isoparaffin-based solvent "Isopar M": manufactured by Exxon Mobil Corporation

Naphthene-based solvent "Exxsol D130": manufactured by Exxon Mobil Corporation

[Evaluations]

Using the inks obtained in the above examples and comparative examples, evaluations were performed using the methods described below. The results of these evaluations are shown in Table 4, Table 5 and Table 6.

(Ink Mist Generation)

Each of the inks described above was mounted in a line-type inkjet printer "ORPHIS-FW5230" (manufactured by RISO KAGAKU CORPORATION), and printed items were obtained by performing single-sided printing of 1,000 copies of a solid image onto a plain paper "RISO Paper Thin Type" (manufactured by RISO KAGAKU CORPORATION).

The ORPHIS FW5230 is a system that uses a line-type inkjet head, wherein the paper is transported in a sub-scanning direction perpendicular to the main scanning direction (the direction along which the nozzles are aligned) while printing is conducted.

After printing 1,000 printed items, the degree of mist contamination inside the printing device was inspected visually and evaluated against the following criteria. Mist contamination is observed when the ink disperses in a mist-like form and adheres to the inside of the printing device during discharge of the ink from the inkjet nozzles.

A: almost no contamination visible

B: some contamination visible, but at a level not problematic for actual use

C: marked contamination, of a level problematic for actual use (Surface Density)

A printed item was obtained in the same manner as that described above for the evaluation of ink mist generation. The printed item was left to stand for one day, and the surface OD value of the printed surface of the printed item was then measured using an optical densitometer (RD920, manufactured by Macbeth Corporation). The surface density was evaluated against the following criteria.

A: surface OD value of 1.10 or greater
B: surface OD value of at least 1.05 but less than 1.10
C: surface OD value of less than 1.05

(Strike-Through)

A printed item was obtained in the same manner as that described above for the evaluation of ink mist generation. The printed item was left to stand for one day, and the rear surface OD value of the rear surface of the printed item was then measured using an optical densitometer (RD920, manufactured by Macbeth Corporation). Strike-through was evaluated against the following criteria.

A: rear surface OD value of less than 0.13
B: rear surface OD value of 0.13 or greater (Ink Foaming)

A 30 mL sample of each of the above inks was placed in a 50 mL glass container, shaken well, and then left to stand. The time taken from the completion of shaking until the foam disappeared was measured. The ink foaming was then evaluated against the following criteria.

A: large foam bubbles disappear in less than one minute
B: large foam bubbles disappear in at least one minute but less than two minutes
C: large foam bubbles remain even after two minutes

TABLE 4

Ink formulations and evaluation results

| Units: % by mass | | C number per molecule | Number of atoms A in main chain | Number of atoms B in side chains | B/A | Example 1 | Example 2 | Example 3 |
|---|---|---|---|---|---|---|---|---|
| Pigments | Carbon black MA77 | | | | | 5.00 | 5.00 | 5.00 |
| | Carbon black NEROX500 | | | | | — | — | — |
| Pigment dispersants | Solsperse 18000 | | | | | 5.00 | 5.00 | 5.00 |
| | Solsperse 13940 | | | | | — | — | — |
| Fatty acid esters | Hexyl laurate | 18 | 19 | 1 | 0.05 | — | — | — |
| | 2-Ethylhexyl palmitate | 24 | 23 | 3 | 0.13 | — | — | — |
| | 2-Ethylhexyl 2-ethylhexanoate | 16 | 13 | 5 | 0.38 | 50.00 | — | — |
| | Octyl 2-butyloctanoate | 20 | 17 | 5 | 0.29 | — | 50.00 | — |
| | 2-Ethylhexyl 2-butyloctanoate | 20 | 15 | 7 | 0.47 | — | — | 50.00 |
| | Decyl 2-butyloctanoate | 22 | 19 | 5 | 0.26 | — | — | — |
| | 2-Hexyldecyl heptanoate | 23 | 18 | 7 | 0.39 | — | — | — |
| | 2-Hexyldecyl octanoate | 24 | 19 | 7 | 0.37 | — | — | — |
| | 2-Hexyldecyl 2-ethylhexanoate | 24 | 17 | 9 | 0.53 | — | — | — |
| | 2-Octyldodecyl decanoate | 30 | 23 | 9 | 0.39 | — | — | — |
| Silicone oils | Dimethyl silicone KF-96L-5CS | | | | | — | — | — |
| | Dimethyl silicone KF-96-10CS | | | | | — | — | — |
| | Alkyl-modified silicone FZ-3196 | | | | | 40.00 | 40.00 | 40.00 |
| | Alkyl-modified silicone (1) | | | | | — | — | — |
| | Alkyl-modified silicone (2) | | | | | — | — | — |
| | Alkyl-modified silicone (3) | | | | | — | — | — |
| Hydrocarbon solvents | Isoparaffin-based solvent Isopar M | | | | | — | — | — |
| | Naphthene-based solvent Exxsol D130 | | | | | — | — | — |
| Total (% by mass) | | | | | | 100.00 | 100.00 | 100.00 |
| Ink mist generation | | | | | | A | A | A |
| Surface density | | | | | | A | A | A |
| Strike-through | | | | | | A | A | A |
| Ink foaming | | | | | | B | A | A |

TABLE 4-continued

| | Ink formulations and evaluation results | | | | | | |
|---|---|---|---|---|---|---|---|
| | Units: % by mass | Example 4 | Example 5 | Example 6 | Example 7 | Example 8 | Example 9 |
| Pigments | Carbon black MA77 | 5.00 | 5.00 | 5.00 | 5.00 | 5.00 | — |
| | Carbon black NEROX500 | — | — | — | — | — | 5.00 |
| Pigment dispersants | Solsperse 18000 | 5.00 | 5.00 | 5.00 | 5.00 | 5.00 | — |
| | Solsperse 13940 | — | — | — | — | — | 5.00 |
| Fatty acid esters | Hexyl laurate | — | — | — | — | — | — |
| | 2-Ethylhexyl palmitate | — | — | — | — | — | — |
| | 2-Ethylhexyl 2-ethylhexanoate | — | — | — | — | — | — |
| | Octyl 2-butyloctanoate | — | — | — | — | — | 50.00 |
| | 2-Ethylhexyl 2-butyloctanoate | — | — | — | — | — | — |
| | Decyl 2-butyloctanoate | 50.00 | — | — | — | — | — |
| | 2-Hexyldecyl heptanoate | — | 50.00 | — | — | — | — |
| | 2-Hexyldecyl octanoate | — | — | 50.00 | — | — | — |
| | 2-Hexyldecyl 2-ethylhexanoate | — | — | — | 50.00 | — | — |
| | 2-Octyldodecyl decanoate | — | — | — | — | 50.00 | — |
| Silicone oils | Dimethyl silicone KF-96L-5CS | — | — | — | — | — | — |
| | Dimethyl silicone KF-96-10CS | — | — | — | — | — | — |
| | Alkyl-modified silicone FZ-3196 | 40.00 | 40.00 | 40.00 | 40.00 | 40.00 | 40.00 |
| | Alkyl-modified silicone (1) | — | — | — | — | — | — |
| | Alkyl-modified silicone (2) | — | — | — | — | — | — |
| | Alkyl-modified silicone (3) | — | — | — | — | — | — |
| Hydrocarbon solvents | Isoparaffin-based solvent Isopar M | — | — | — | — | — | — |
| | Naphthene-based solvent Exxsol D130 | — | — | — | — | — | — |
| | Total (% by mass) | 100.00 | 100.00 | 100.00 | 100.00 | 100.00 | 100.00 |
| | Ink mist generation | A | A | A | A | A | A |
| | Surface density | A | A | A | A | A | A |
| | Strike-through | A | A | B | B | B | A |
| | Ink foaming | A | A | A | A | A | A |

TABLE 5

| | | | Fatty acid ester | | | | | |
|---|---|---|---|---|---|---|---|---|
| | Units: % by mass | C number per molecule | Number of atoms A in main chain | Number of atoms B in side chains | B/A | Example 10 | Example 11 | Example 12 |
| Pigments | Carbon black MA77 | | | | | 5.00 | 5.00 | 5.00 |
| | NEROX500 (carbon black) | | | | | — | — | — |
| Pigment dispersants | Solsperse 18000 | | | | | 5.00 | 5.00 | 5.00 |
| | Solsperse 13940 | | | | | — | — | — |
| Fatty acid esters | Hexyl laurate | 18 | 19 | 1 | 0.05 | — | — | — |
| | 2-Ethylhexyl palmitate | 24 | 23 | 3 | 0.13 | — | — | — |
| | 2-Ethylhexyl 2-ethylhexanoate | 16 | 13 | 5 | 0.38 | — | — | — |
| | Octyl 2-butyloctanoate | 20 | 17 | 5 | 0.29 | 50.00 | 50.00 | 50.00 |

TABLE 5-continued

|  |  |  |  |  |  |  |  |  |
|---|---|---|---|---|---|---|---|---|
|  | 2-Ethylhexyl 2-butyloctanoate | 20 | 15 | 7 | 0.47 | — | — | — |
|  | Decyl 2-butyloctanoate | 22 | 19 | 5 | 0.26 | — | — | — |
|  | 2-Hexyldecyl heptanoate | 23 | 18 | 7 | 0.39 | — | — | — |
|  | 2-Hexyldecyl octanoate | 24 | 19 | 7 | 0.37 | — | — | — |
|  | 2-Hexyldecyl 2-ethylhexanoate | 24 | 17 | 9 | 0.53 | — | — | — |
|  | 2-Octyldodecyl decanoate | 30 | 23 | 9 | 0.39 | — | — | — |
| Silicone oils | Dimethyl silicone KF-96L-5CS |  |  |  |  | 40.00 | — | — |
|  | Dimethyl silicone KF-96-10CS |  |  |  |  | — | 40.00 | — |
|  | Alkyl-modified silicone FZ-3196 |  |  |  |  | — | — | — |
|  | Alkyl-modified silicone (1) |  |  |  |  | — | — | 40.00 |
|  | Alkyl-modified silicone (2) |  |  |  |  | — | — | — |
|  | Alkyl-modified silicone (3) |  |  |  |  | — | — | — |
| Hydrocarbon solvents | Isoparaffin-based solvent Isopar M |  |  |  |  | — | — | — |
|  | Naphthene-based solvent Exxsol D130 |  |  |  |  | — | — | — |
| Total (% by mass) |  |  |  |  |  | 100.00 | 100.00 | 100.00 |
| Ink mist generation |  |  |  |  |  | A | A | A |
| Surface density |  |  |  |  |  | A | A | A |
| Strike-through |  |  |  |  |  | A | A | A |
| Ink foaming |  |  |  |  |  | B | B | A |

| Units: % by mass | | | Example 13 | Example 14 | Example 15 | Example 16 | Example 17 | Example 18 |
|---|---|---|---|---|---|---|---|---|
| Pigments |  | Carbon black MA77 | 5.00 | 5.00 | 5.00 | 5.00 | 5.00 | 5.00 |
|  |  | NEROX500 (carbon black) | — | — | — | — | — | — |
| Pigment dispersants |  | Solsperse 18000 | 5.00 | 5.00 | 5.00 | 5.00 | 5.00 | 5.00 |
|  |  | Solsperse 13940 | — | — | — | — | — | — |
| Fatty acid esters |  | Hexyl laurate | — | — | — | — | — | — |
|  |  | 2-Ethylhexyl palmitate | — | — | — | — | — | — |
|  |  | 2-Ethylhexyl 2-ethylhexanoate | — | — | — | — | — | — |
|  |  | Octyl 2-butyloctanoate | 50.00 | 50.00 | 80.00 | 10.00 | 40.00 | 40.00 |
|  |  | 2-Ethylhexyl 2-butyloctanoate | — | — | — | — | — | — |
|  |  | Decyl 2-butyloctanoate | — | — | — | — | — | — |
|  |  | 2-Hexyldecyl heptanoate | — | — | — | — | — | — |
|  |  | 2-Hexyldecyl octanoate | — | — | — | — | — | — |
|  |  | 2-Hexyldecyl 2-ethylhexanoate | — | — | — | — | — | — |
|  |  | 2-Octyldodecyl decanoate | — | — | — | — | — | — |
|  | Silicone oils | Dimethyl silicone KF-96L-5CS | — | — | — | — | — | — |
|  |  | Dimethyl silicone KF-96-10CS | — | — | — | — | — | — |
|  |  | Alkyl-modified silicone FZ-3196 | — | — | 10.00 | 80.00 | 30.00 | 30.00 |
|  |  | Alkyl-modified silicone (1) | — | — | — | — | — | — |
|  |  | Alkyl-modified silicone (2) | 40.00 | — | — | — | — | — |
|  |  | Alkyl-modified silicone (3) | — | 40.00 | — | — | — | — |

TABLE 5-continued

| | | | | | | | |
|---|---|---|---|---|---|---|---|
| Hydrocarbon solvents | Isoparaffin-based solvent Isopar M | — | — | — | — | 20.00 | — |
| | Naphthene-based solvent Exxsol D130 | — | — | — | — | — | 20.00 |
| Total (% by mass) | | 100.00 | 100.00 | 100.00 | 100.00 | 100.00 | 100.00 |
| Ink mist generation | | A | A | A | B | A | A |
| Surface density | | A | A | B | A | A | A |
| Strike-through | | A | A | A | A | A | A |
| Ink foaming | | A | A | A | A | A | A |

TABLE 6

| | | Fatty acid ester | | | | | | | |
|---|---|---|---|---|---|---|---|---|---|
| Units: % by mass | | C number per molecule | Number of atoms A in main chain | Number of atoms B in side chains | B/A | Comparative Example 1 | Comparative Example 2 | Comparative Example 3 | Comparative Example 4 |
| Pigment | Carbon black MA77 | | | | | 5.00 | 5.00 | 5.00 | 5.00 |
| Pigment dispersant | Solsperse 18000 | | | | | 5.00 | 5.00 | 5.00 | 5.00 |
| Fatty acid esters | Hexyl laurate | 18 | 19 | 1 | 0.05 | 50.00 | — | — | — |
| | 2-Ethylhexyl palmitate | 24 | 23 | 1 | 0.13 | — | 50.00 | — | — |
| | 2-Ethylhexyl 2-ethylhexanoate | 16 | 13 | 5 | 0.38 | — | — | 90.00 | — |
| Silicone oil | Alkyl-modified silicone FZ-3196 | | | | | 40.00 | 40.00 | — | 90.00 |
| Total (% by mass) | | | | | | 100.00 | 100.00 | 100.00 | 100.00 |
| Ink mist generation | | | | | | A | A | A | C |
| Surface density | | | | | | A | A | C | A |
| Strike-through | | | | | | A | B | C | A |
| Ink foaming | | | | | | C | C | A | A |

As shown in the tables, each of the inks of the examples was able to prevent ink mist generation, had a high surface density for the printed items, and was able to prevent strike-through and ink foaming. Although no particular details were recorded, each of the inks of the examples also had a suitable viscosity.

In Examples 1 to 8, various fatty acid esters for which the ratio of (number of atoms in side chains/number of atoms in the main chain) (B/A) was at least 0.2 were used, and favorable results were obtained in each case.

Based on Examples 1 to 8, it is evident that by using a fatty acid ester having a larger number of carbon atoms per molecule, and combining this fatty acid ester with a silicone oil, ink foaming can be better prevented.

Based on Examples 1 to 8, it is evident that by using a fatty acid ester having a smaller number of carbon atoms per molecule, penetration of the ink solvent into the paper is suppressed, and strike-through is better prevented.

In Example 9, a different pigment and pigment dispersant were used, and favorable results were obtained.

In Examples 10 to 14, various silicone oils were used, and favorable results were obtained in each case. Moreover, by using an alkyl-modified silicone oil, ink foaming was able to be better prevented.

Based on Examples 15 and 16, it is evident that favorable results can be obtained when the amount of the fatty acid ester is within a range from 10 to 80% by mass and the amount of the silicone oil is within a range from 10 to 80% by mass.

Based on Examples 17 and 18, it is evident that even when a hydrocarbon solvent is used in combination with the fatty acid ester and the silicone oil, favorable results can be obtained.

In Comparative Examples 1 and 2, fatty acid esters for which the ratio of (number of atoms in side chains/number of atoms in the main chain) (B/A) was less than 0.2 were used, and marked ink foaming occurred.

In Comparative Examples 3 and 4, only a single type of solvent was used, and although ink foaming was not a problem, the other results were poor.

Comparative Example 3 was an example that used only a fatty acid ester for which the ratio of (number of atoms in side chains/number of atoms in the main chain) (B/A) was at least 0.2, and because the fatty acid ester penetrated readily into the paper, the surface density deteriorated and strike-through occurred.

Comparative Example 4 was an example that used only a silicone oil, and because the silicone oil had low surface tension, severe ink mist generation occurred.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An oil-based inkjet ink comprising a pigment, a pigment dispersant and a non-aqueous solvent, wherein the non-aqueous solvent comprises a silicone oil, and a fatty acid ester having 10 to 40 carbon atoms per molecule and having a ratio of (total number of atoms in side chains/total number of atoms in main chain) of at least 0.20.

2. The oil-based inkjet ink according to claim 1, wherein the fatty acid ester has 16 to 30 carbon atoms per molecule.

3. The oil-based inkjet ink according to claim 1, wherein the fatty acid ester is a fatty acid ester having a side chain of at least 4 carbon atoms.

4. The oil-based inkjet ink according to claim 2, wherein the fatty acid ester is a fatty acid ester having a side chain of at least 4 carbon atoms.

5. The oil-based inkjet ink according to claim 1, wherein the silicone oil is an alkyl-modified silicone.

6. The oil-based inkjet ink according to claim 2, wherein the silicone oil is an alkyl-modified silicone.

7. The oil-based inkjet ink according to claim 3, wherein the silicone oil is an alkyl-modified silicone.

8. The oil-based inkjet ink according to claim 4, wherein the silicone oil is an alkyl-modified silicone.

\* \* \* \* \*